United States Patent [19]

Yamawaki

[11] Patent Number: 5,093,189

[45] Date of Patent: Mar. 3, 1992

[54] BUTENE-1 POLYMER FILM AND LAMINATED FILM THEREOF

[75] Inventor: Takashi Yamawaki, Ichihara, Japan

[73] Assignees: Idemitsu Petrochemical Company, Tokyo, Japan; Neste Oy, Espoo, Finland

[21] Appl. No.: 290,210

[22] Filed: Dec. 27, 1988

[30] Foreign Application Priority Data

Dec. 28, 1987 [JP] Japan .................... 62-332784

[51] Int. Cl.$^5$ .................... C08L 23/20; B32B 27/28; B32B 27/32
[52] U.S. Cl. .................... 428/220; 428/336; 428/476.9; 428/483; 428/516; 428/335; 525/240; 525/191
[58] Field of Search ................ 525/240, 191; 428/516, 428/476.9, 483, 220

[56] References Cited

U.S. PATENT DOCUMENTS

| | | | |
|---|---|---|---|
| 3,634,552 | 1/1972 | Foglia et al. | 525/240 |
| 4,226,905 | 10/1980 | Harbourne | 525/240 |
| 4,230,767 | 10/1980 | Isaka et al. | 428/516 |
| 4,734,328 | 3/1988 | Kohyama et al. | 428/516 |
| 4,870,122 | 9/1989 | Lu | 525/240 |

FOREIGN PATENT DOCUMENTS

| | | |
|---|---|---|
| 0184324 | 11/1986 | European Pat. Off. |
| 2314212 | 7/1977 | France |
| 61-107378 | 5/1986 | Japan |
| 1497577 | 6/1975 | United Kingdom |

OTHER PUBLICATIONS

Database Chemical Abstracts (HOST:STN), 1990, Ref. No. 98 (24) Abstract No. 199461c, Columbus, Ohio U.S.; & JP-B-57 051 870 (Mitsui Toatsu Chemicals) 04-11-1982, Whole Abstract.

Primary Examiner—Carman J. Seccuro
Attorney, Agent, or Firm—Armstrong, Nikaido, Marmelstein, Kubovcik & Murray

[57] ABSTRACT

The present invention provides a butene-1 polymer film which comprises a composition comprising 100 parts by weight of a butene-1 polymer having a melt index of 0.1–20 g/10 min, a ratio of weight-average molecular weight/number-average molecular weight of 3–12 and having a maximum melting point of 60°–140° C. measured by differential scanning calorimetric analysis method and 200 parts by weight or less of an olefin polymer and which has a tensile modulus of 500–8,000 kg/cm$^2$, a tear strength in TD or MD of 10 kg/cm or less and a ratio of tear strength in MD and tear strength in TD (MD/TD or TD/MD) of 4 or more.

The present invention further provides a laminated film comprising the above butene-1 polymer film and a different polyolefin resin layer laminated on at least one surface of the butene-1 polymer film.

15 Claims, No Drawings

BUTENE-1 POLYMER FILM AND LAMINATED FILM THEREOF

BACKGROUND OF THE INVENTION

1. Field of the Invention

The present invention relates to a butene-1 polymer film and a laminated film made therefrom and more particularly it relates to a butene-1 polymer film excellent in tearability and a laminated film made therefrom.

2. Description of the Related Art

Hitherto, synthetic resin films have been used for bags for packaging liquid flavoring materials, soups and the like.

However, conventional films are difficult to tear. When a bag made of such conventional film in which liquid or pasty material is packaged is torn in an attempt to open the bag, too much force is applied thereto, resulting in inconveniences that content is forcedly discharged from the torn part in unexpected direction to stain clothes and the like.

Therefore, demand for improvement in tearability of synthetic resin film has been increased in order that application of only a slight force can tear the film as if it is cut by a knife.

Under the circumstances, an easily tearable cap label comprising a film molded from a specific high-density polyethylene has been proposed for satisfying the demand. (Japanese Patent Laid-Open No. 61-107378).

However, this film is very low in Elemendorf tear strength, namely, 2 kg/cm or less and is insufficient in strength as bag for packing liquid flavoring material or soup.

At present, low-density polyethylene and linear low-density polyethylene are used for sealant layer of films used for bags for packaging liquid flavoring material or soup. However, these resins are difficult to orientate and readily form necking and so, the film becomes difficult to tear during tearing operation.

SUMMARY OF THE INVENTION

The present invention has been made under the above circumstances.

The object of the present invention is to provide a synthetic resin film which is free from difficulty to tear as seen in the conventional films; which one can easily start to tear without causing difficulty to tear during the tearing operation; and which can be torn as if it is cut by a knife and besides is sufficiently high in mechanical strength.

The first invention of the present application for attaining the above object is a butene-1 polymer film, characterized by comprising a composition which comprises 100 parts by weight of a butene-1 polymer having a melt index of 0.1-20 g/10 min, a ratio of weight-average molecular weight (Mw) and number-average molecular weight (Mn) (Mw/Mn) of 3-12 and a maximum melting point of 60°-140° C. measured by differential scanning calorimetric analysis and 200 parts by weight or less of an olefin polymer, said film having a tensile modulus of 500-8,000 kg/cm$^2$, a tear strength in TD or MD of 10 kg/cm or less and a ratio of tear strength in MD and that in TD (MD/TD or TD/MD) (sometimes referred to as "tear strength ratio" hereinafter) of 4 or more.

The second invention is a laminated film comprising a butene-1 polymer film and a polyolefin resin layer laminated on at least one surface of said butene-1 polymer film, said butene-1 polymer film comprising a composition which comprises 100 parts by weight of a butene-1 polymer having a melt index of 0.1-20 g/10 min, a ratio of weight-average molecular weight (Mw) and number-average molecular weight (Mn) (Mw/Mn) of 3-12 and a maximum melting point of 60°-140° C. measured by differential scanning calorimetric analysis and 200 parts by weight or less of an olefin polymer and having a tensile modulus of 500-8,000 kg/cm$^2$, a tear strength in TD or MD of 10 kg/cm or less and a tear strength ratio as defined above of 4 or more.

DESCRIPTION OF THE PREFERRED EMBODIMENTS

Butene-1 Polymer

The film of the present invention comprises a butene-1 polymer and, if necessary, an olefin polymer.

The butene-1 polymer in the present invention may be any of butene-1 homopolymer, butene-1 copolymer containing other α-olefin unit such as ethylene, propylene, pentene-1 or hexene-1 and mixtures thereof.

The melt index of the butene-1 polymer in the present invention is 0.1-20 g/10 min, preferably 0.3-10 g/10 min.

If the melt index of butene-1 polymer is less than 0.1 g/10 min, ununiformity in section of film becomes great at molding. If more than 20 g/10 min, butene-1 polymer is difficult to orientate and the ratio of tear strength in TD and MD decreases and thus, the film becomes difficult to tear.

In the present invention, ratio of weight-average molecular weight and number-average molecular weight (Mw/Mn) of butene-1 polymer is 3-12, preferably 3-9.

When the ratio (Mw/Mn) is less than 3, film has surface waviness at molding into film and when more than 12, mechanical strengths of the film such as impact resistance are deteriorated.

In the present invention, the butene-1 polymer has a maximum melting point (DSC maximum melting point) of 60°-140° C. measured by differential scanning calorimetric analysis method. The maximum melting point of butene-1 polymer is a peak which appears on the highest temperature side when a dried butene-1 polymer is heated from 0° C. to 200° C. at a heating rate of 10° C./min to measure endothermic peak, and a peak on the lowest temperature side or shoulder is a minimum melting point.

When maximum melting point of butene-1 polymer measured by differential scanning calorimetric analysis is lower than 60° C., tackiness of the resulting film is high and value as a product decreases and when higher than 140° C., heat-sealing temperature is high and productivity at making of bags decreases.

Among the above-mentioned butene-1 polymers, butene-1 copolymers containing ethylene unit and butene-1 unit are preferred. Mainly, crystallinity of copolymers can be lowered by containing ethylene unit.

Preferable butene-1 copolymers in the present invention contain the ethylene unit and the butene-1 unit within the range of 1:99-15:85 in molar ratio.

If molar ratio of the ethylene unit in the butene-1 copolymer is lower than the above range, crystallinity of the copolymer is not decreased and thus transparency of the molded film is lowered. If the molar ratio of the ethylene unit is higher than the above range, the copolymer becomes heterogeneous or viscous.

In the present invention, it is especially preferred to specify the molar ratio within the range of 1:99–10:90. Within this range, it is possible to provide a copolymer which can afford a molded film of further homogeneous and higher transparency.

Melt index of the preferable butene-1 copolymer is 0.1–20 g/10 min as mentioned above.

Molecular weight distribution in the preferable butene-1 copolymer, namely, the ratio of weight-average molecular weight (Mw) and number-average molecular weight (Mn) (Mw/Mn) is 3–12 as mentioned before.

When the preferable butene-1 copolymer is subjected to analysis by a differential scanning calorimeter, two endothermic peaks which indicate the minimum melting point and maximum melting point are obtained. The maximum melting point is usually within the range of 70°–120° C. In the present invention, the minimum melting point is determined by a peak or shoulder which appears on the lowest temperature side when heat absorbing peak is measured by heating a dried butene-1 copolymer mentioned above from 0° C. to 200° C. at a heating rate of 10° C./min.

It is desired that in the preferable butene-1 copolymer of the present invention, difference in maximum melting point and minimum melting point measured by differential scanning calorimeter (temperature difference between the maximum value and minimum value in melting point) is within the range of 2°–40° C.

This difference in temperature affects especially processing characteristics and temperature (heat-sealing temperature) for laminating molded films by pressing and heating.

That is, if the difference is less than 2° C., heat-sealing temperature increases to deteriorate heat sealibility of molded films and when the difference is more than 40° C., butene-1 copolymer becomes viscous and moldability is reduced. Especially when the maximum melting point is lower than 70° C., the copolymer may have tackiness at room temperature and such copolymer cannot be normally used as molding raw materials. When the maximum melting point is higher than 120° C., heat-sealing temperature is high and sometimes good heat sealing cannot be attained.

Furthermore, heat of fusion (determined by a straight line connecting base lines of peak or shoulder which appears by differential scanning calorimetric analysis) of the preferred butene-1 copolymer of the present invention is within the range of 2–25 cal/g. When the heat of fusion is less than 2 cal/g, the copolymer may become tacky and when more than 25 cal/g, transparency of the molded films may decrease.

Blocking degree (X) of ethylene in main chain of the butene-1 copolymer can be measured by measuring C—NMR of the copolymer and identifying each triad using the method disclosed in "Macromolecules", 15, 353, (1982) and in accordance with the following formula.

$$X = I/E$$

In the above formula, I is a rate of block polymerization of ethylene chain in the copolymer and normally expressed by the following formula.

$$I = \frac{I_{EEE}}{I_{BBE} + I_{EBE} + I_{BEB}}$$

E is content of ethylene in the copolymer and is normally expressed by the following formula.

$$E \text{ (mol \%)} = \frac{I_{EEE/2} + I_{EBE} + I_{BEE}}{I_{BBB} + I_{BBE} + I_{EBE} + I_{EEE/2} + I_{BEE} + I_{BEB}} \times 100$$

In the above formulas, for example, $I_{EEE}$ indicates mol number of ethylene unit-ethylene unit-ethylene unit existing in the butene-1 copolymer. Similarly, $I_{BBE}$, $I_{EBE}$ and $I_{BEB}$ indicate kind of unit which comprises three monomer units in the copolymer.

Blocking degree (X) of ethylene in the butene-1 copolymer which is preferred in the present invention is required to be 0.015 or less and is preferably as low as possible and thus most preferred is 0.

That is, when the three monomer units in the copolymer is considered, crystallinity of the copolymer becomes higher with increase in the mol number of unit which consists of only three ethylene units. Therefore, when blocking degree (X) of ethylene is higher than 0.015, transparency of, for example, molded film decreases.

Amount of boiling diethyl ether soluble matter in the preferred butene-1 copolymer is 3–25% by weight.

In general, solubility in boiling diethyl ether decreases with increase in polymerization degree of the copolymer and decreases with increase in crystallinity.

The limitation of content of boiling diethyl ether soluble matter of the preferred butene-1 copolymer to the above range means to limit amount of component of low polymerization degree in the butene-1 copolymer and crystallinity of the copolymer.

Therefore, if the content of boiling diethyl ether soluble matter is less than 3% by weight, transparency of molded film is reduced and if it is more than 25% by weight, content of component of low polymerization degree increases resulting in tackiness.

The butene-1 polymer of the present invention can be produced by known polymerization methods such as vapor phase polymerization, bulk polymerization, slurry polymerization and the like.

Especially, the above-mentioned preferred butene-1 copolymer can be easily produced, for example, by reacting ethylene and butene-1 in vapor phase using as a catalyst a specific solid catalyst component obtained by using as a starting material a magnesium compound which is represented by the formula $MgR^1R^2$ or $Mg(OR^1)_m X_n$ (wherein $R^1$ and $R^2$ each represents an alkyl group, m satisfies $0 \leq m \leq 2$ and n satisfies $0 \leq n \leq 2$), an organoaluminum compound and a specific electron donating compound.

Specifically, it can be produced by experimentally setting production conditions in the production methods disclosed in Japanese Patent Application Nos. 61-144093, 61-196265, 61-196266 and 61-196722 considering the above-mentioned characteristics of the copolymer.

Production of the preferred butene-1 copolymer is explained referring to the method disclosed in Japanese Patent Application No. 61-196266, but the copolymer should not be limited by this method.

The above-mentioned preferable butene-1 copolymer can be easily produced by reacting butene-1 and ethylene under vapor phase polymerization conditions in the presence of a catalyst comprising the following solid catalyst component (A), an organoaluminum compound (B) and an electron donating compound (C).

The solid catalyst component (A) can be prepared by chlorinating at least one organomagnesium compound represented by the formula: MgR$^{10}$R (wherein R$^{10}$ and R$^{20}$ which may be identical or different each represents an alkyl group of 1-20 carbon atoms) with at least one chlorinating agent to obtain a carrier and contacting this carrier with a halide of tetravalent titanium in the presence of an electron donating compound at −25° C.~+180° C.

As the organomagnesium compound, mention may be made of, for example, alkylmagnesium compounds such as diethylmagnesium, ethylbutylmagnesium, ethylhexylmagnesium, ethyloctylmagnesium, dibutylmagnesium, butylhexylmagnesium, butyloctylmagnesium and dicyclohexylmagnesium.

Examples of the chlorinating agent are chlorine gas and alkyl chloride and it is preferred in the present invention to use chlorine gas and butyl chloride in combination.

Chlorination is normally effected at 0°-100° C. (preferably 20°-60° C., especially preferably 20°-40° C.).

By this chlorination, a part of alkyl group attached to magnesium atom is substituted with chlorine atom. Since a part of alkyl group remains, this remaining alkyl group inhibits production of normal crystal lattice to give non-layerous product of very small crystal diameter having suitable surface area and pore volume.

The thus obtained non-layerous product is, if necessary, subjected to treatment with alcohol and then, is treated with a halide of tetravalent titanium in the presence of an electron donor. The treatment with halide of tetravalent titanium is normally effected at −25° C.~+180° C.

As the halide of tetravalent titanium, mention may be made of, for example, titanium tetrahalide, alkoxytitanium trihalide, alkoxytitanium dihalide and trialkoxytitanium monohalide. Titanium tetrachloride is especially preferred.

As the electron donor, there may be used organic compounds containing oxygen, nitrogen, phosphorus or sulfur.

As examples of the electron donor, mention may be made of amines, amides, ketones, nitriles, phosphines, phosphoamides, esters, ethers, thioethers, thioesters, acid anhydrides, acid halides, acid amides, aldehydes, organic acids and esters.

Among them, preferred are esters, ethers, ketones and acid anhydrides and examples thereof are ethyl benzoate, ethyl p-methoxybenzoate, ethyl p-ethoxybenzoate, methyl toluylate, diisobutyl phthalate, benzoquinone and benzoic anhydride.

It is desirable that the resulting solid catalyst component (A) has a ratio of halogen/titanium (molar ratio) of 3-200 (preferably 4-100) and a ratio of magnesium/titanium (molar ratio) of 1-90 (preferably 5-70).

The organoaluminum compound (B) has no special limitation, but a trialkylaluminum is especially preferred.

As the electron donating compound (C), there may be used a heterocyclic compound represented by the formula (2).

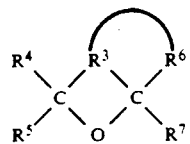

(2)

(wherein R$^3$ and R$^6$ each represents a hydrocarbon group, preferably substituted or unsubstituted saturated or unsaturated hydrocarbon of 2-5 carbon atoms and R$^4$,R$^5$ and R$^7$ each represents a hydrogen atom or a hydrocarbon group, preferably a hydrogen atom or a substituted or unsubstituted saturated or unsaturated hydrocarbon of 1-5 carbon atoms.

As the heterocyclic compound, mention may be made of, for example, 1,4-cineole, 1,8-cineole, m-cineole, pinol, benzofuran, 2,3-dihydrobenzofuran (coumarane), 2H-chromene, 4H-chromene, chroman, isochroman, dibenzofuran and xanthene. These heterocyclic compounds may be used alone or in combination of 2 or more. Among them, 1,8-cineole is especially preferred.

Composition of the catalyst used in preparation of the above-mentioned preferable butene-1 copolymer is that organoaluminum compound (B) is normally in an amount of 0.1-1000 times (preferably 1-500 times) the mol of titanium atom in the tetravalent titanium compound in solid catalyst component (A). Electron donating compound (C) is used in an amount of 0.1-500 times (preferably 0.5-200 times) the mol of titanium atom in the tetravalent titanium compound in solid catalyst component (A).

Vapor phase polymerization temperature is normally 45°-80° C. (preferably 50°-70° C.).

Polymerization pressure can be optionally set within the range where liquefaction of starting materials does not substantially occur and is normally 1-15 kg/cm$^2$.

Furthermore, molar ratio of ethylene and butene-1 introduced can be optionally set within the range of molar ratio of them in copolymer to be obtained (namely, 1:99-15:85).

Moreover, a molecular weight modifier such as hydrogen may coexist for adjustment of molecular weight. Furthermore, an inert gas having a boiling point lower than that of butene-1 (for example, nitrogen, methane, ethane, propane) may also coexist for preventing agglomeration of copolymer. Olefin polymer:

The olefin polymers in the present invention may be homopolymers of α-olefin other than butene-1 such as ethylene, propylene, pentene-1, hexene-1 and the like, copolymers thereof and mixtures thereof.

Polypropylene is preferred.

Resin Composition

The butene-1 polymer film of the present invention is formed from a composition comprising 100 parts by weight of the above butene-1 polymer and 200 parts by weight or less of an olefin polymer. The olefin polymer may be 0 part by weight.

When amount of the olefin polymer is more than 200 parts by weight, the property of easy orientation of polybutene-1 is difficult to exhibit.

In the present invention, the polybutene-1 polymer and, if necessary, at least one of the olefin polymers can be blended by ordinary blending method such as dry blending method, and various mixing machines, kneading machines and extruders may be used therefor.

Butene-1 Polymer Film

The butene-1 polymer film of the present invention can be produced from material containing butene-1 polymer and olefin polymer obtained as above by known film-molding methods such as inflation molding method, T-die extrusion method and stretching method.

For the thus obtained butene-1 polymer films, it is important in the present invention that they have the following properties.

That is, tensile modulus is 500 kg/cm$^2$–8,000 kg/cm$^2$, preferably 800–7,500 kg/cm$^2$, tear strength in TD or MD is 10 kg/cm or less, preferably 10–3 kg/cm and tear strength ratio (MD/TD or TD/MD) defined here is 4 times or more, preferably 4–30.

If the tensile modulus is less than 500 kg/cm$^2$, stiffness of film decreases and sometimes troubles occur in making of bags. If it is more than 8,000 kg/cm$^2$, film becomes too hard and is not preferred as bags for packing liquid.

If Elemendorf tear strength of film in TD or MD is more than 10 kg/cm, the film cannot be easily torn by fingers.

When Elemendorf tear strength of film is less than 4 times in terms of tear strength ratio in TD and MD, there may occur a phenomenon that the film tears obliquely and this is undesired.

Thickness of the butene-1 polymer film of the present invention can be optionally determined depending on use and normally is 10–150 μm.

Polyolefin Resin

The butene-1 polymer film per se is a film excellent in tearability, but when a polyolefin resin is laminated on at least one surface of the film, a laminated film superior in transparency of the present invention can be obtained.

In the laminated film of the present invention, the polyolefin resin may be any of homopolymers of other α-olefins such as ethylene, propylene, pentene-1 and hexene-1, copolymers thereof and mixtures of these polymers.

Low-density polyethylene, linear low-density polyethylene and polypropylene are preferred and a random polypropylene is especially preferred. Laminated film:

In the laminated film of the present invention, thickness of butene-1 polymer film as a substrate layer is normally 7–100 μm, preferably 10–80 μm.

Ratio of thickness of butene-1 polymer film as a substratelayer to thickness of polyolefin resin layer as a surface layer is 0.5–20, preferably 1–10.

Within the above range, strength of the laminated film can be sufficiently maintained and besides the characteristic of the excellent tearability of the butene-1 polymer film can be sufficiently exhibited.

Method for production of the laminated film of the present invention has no special limitation and can be optionally chosen from those customarily used for production of laminated films. Ordinarily, there may be employed a method which comprises laminating a heat-melted film using an extruder by extrusion laminate method, cooling and setting the laminate and then monoaxially or biaxially stretching it.

The laminated film of the present invention has a tensile modulus of 500–12,000 kg/cm$^2$, an Elemendorf tear strength of 12 kg/cm or less in TD or MD and a tear strength ratio as defined herebefore of at least 3.5.

The laminated film of the present invention can exhibit further superiority in tensile modulus and tear strength by additionally laminating a polyolefin resin, a polyester resin, a polyamide resin or the like on the polyolefin resin layer.

For such laminated films of 3–5 layers, the polyolefin resin is preferably low-density polyethylene or polypropylene, the polyester resin is preferably polyester terephthalate and the polyamide resin is preferably nylon 66.

Since the film or laminate of the present invention is superior in tearability and has a sufficient strength for use as containers for liquid, they can be suitably used as containers for liquid and troubles at opening of containers containing liquid can be avoided. Furthermore, they can be utilized as a sealant layer of the film of containers for liquid.

The present invention will be explained in more detail by the following examples.

PREPARATION EXAMPLE 1 (PREPARATION OF BUTENE-1 HOMOPOLYMER)

(1) Preparation of Solid Catalyst Component (a)

300 ml of butyloctylmagnesium (20% heptane solution) was charged in a five necked flask equipped with a mechanical stirrer, reflux condenser, a dropping funnel, a gas supplying valve and a thermometer and a solid catalyst component was prepared in the following manner. That is, nitrogen was passed through the suspension to keep an inert atmosphere in the flask. 5 liters of butyl chloride was added to the suspension from the dropping funnel at room temperature. Then, the suspension was chlorinated by adding thereto chlorine gas at a rate of 5 ml/min.

Then, to the mixture was added 2.5 liters of silicone oil at 25°–35° C. and subsequently, thereto was added dropwise 113 ml of ethanol. During the addition of ethanol, chlorinated precipitate was settled as a thick layer. Then, the mixture was stirred at 40° C. for 1 hour. Thereafter, temperature was raised to 75°–80° C. and the solution was left to stand at this temperature overnight.

This solution of high temperature was gently added, by a syphon, to an excess amount of TiCl$_4$ (−25° C.) cooled to low temperature containing diisobutyl phthalate as an electron donor to precipitate a reaction intermediate product in the low temperature TiCl$_4$. Then, the mixture was heated to room temperature. Thereafter, thereto was added diisobutyl phthalate as an electron donor and temperature was raised to 100°–110° C. and the mixture was kept at this temperature for 1 hour. After precipitate settled, the mixture was washed 5–6 times with heptane of 85° C. and the solution was transferred to another flask by syphon. An excess amount of TiCl$_4$ was further added thereto and the mixture was stirred at 110° C. for 1 hour. The resulting precipitate was settled and the supernatant liquid was transferred by syphon. Then, the resulting catalyst component was washed with heptane several times (5–6 times at 80° C.) and dried under lowly reduced pressure. Thus, solid catalyst component (a) having a Ti content of 3.0% by weight was obtained.

(2) Preparation of Catalyst

The solid catalyst component (a) obtained in the above (1) was diluted to 2 mmols Ti/l and introduced into a catalyst supplying tank. To this tank were fed 10 mmols/l of triisobutylaluminum and 4 mmols/l of 1,8-cineole. Thereafter, 4-methylpentene-1 was fed thereto in an amount of 50 g per 1 mmol of titanium. The content in the tank was heated to 55° C. and reaction was allowed to proceed for 15 minutes. Then, reaction product was collected by filtration and dried to obtain a catalyst.

(3) Preparation of Butene-1 Homopolymer

A fluidized bed type polymerizer of 300 mm in diameter and 100 liter in capacity was used. The catalyst obtained in the above (2) was fed from the catalyst supplying tank to the polymerizer at a feed rate of 0.3 mmols/hour in terms of Ti atom and triisobutylaluminum and 1,8-cineole were also fed at a flow rate of 30 mmols/hour and 24 mmols/hour, respectively to said polymerizer (60° C.).

Butene-1, hydrogen gas and nitrogen gas were fed thereto at a gas superficial velocity in column of 35 cm/sec with adjusting partial pressure of butene-1 and nitrogen to 3 kg/cm$^2$ and 4 kg/cm$^2$, respectively. Discharging of the polymer was controlled so as to keep amount of the polymer in the polymerizer at constant.

The obtained butene-1 homopolymer had a melt index of 2.1 g/10 min and a density of 0.910 g/cm$^3$.

This butene-1 homopolymer had a weight-average molecular weight/number-average molecular weight of 4.8 and a heat of fusion of 15.5 cal/g determined by differential scanning calorimetric analysis. Since this was a homopolymer, blocking degree of ethylene was 0.

PREPARATION EXAMPLE 2 (PREPARATION OF BUTENE-1-ETHYLENE COPOLYMER)

A butene-1-ethylene copolymer (ethylene content 2.2 mols) was prepared in the same manner as in Preparation Example 1 except that butene-1 and ethylene were fed at the polymerization step. This copolymer had a melt index of 1.0 g/10 min and a density of 0.902 g/cm$^3$.

Further, this butene-1-ethylene copolymer had a weight-average molecular weight/number-average molecular weight of 5.2 and a heat of fusion of 9.1 cal/g determined by differential scanning calorimetric analysis. Blocking degree of ethylene in this butene-1-ethylene copolymer was 0 as a result of measurement of C—NMR. This copolymer contained 12% by weight of boiling diethyl ether soluble matter.

EXAMPLE 1

The polymer obtained in Preparation Example 1 was subjected to inflation molding to obtain a film of 400 mm in spread width and 30 μm in thickness.

An extruder manufactured by Placo Co. was used at the conditions of die diameter: 120 mm, die clearance: 1.0 mm, discharging amount: 30 kg/hour and take-up speed: 22.6 m/min.

Results of measurement are shown in Table 1.

EXAMPLES 2-3 AND COMPARATIVE EXAMPLES 1-4

In these Examples, starting materials as shown below were used and molding was effected under the same conditions as in Example 1.

EXAMPLE 2

The polymer obtained in Preparation Example 2 was used.

EXAMPLE 3

A blend comprising 50% by weight of the polymer obtained in Preparation Example 2 and 50% by weight of polypropylene (F200S manufactured by Idemitsu Petrochemical Co.) was used.

COMPARATIVE EXAMPLE 1

A linear low-density polyethylene (0128N manufactured by Idemitsu Petrochemical Co.) was used.

COMPARATIVE EXAMPLE 2

A low-density polyethylene (F222 manufactured by Ube Industries Ltd.) was used.

COMPARATIVE EXAMPLE 3

A blend comprising 30% by weight of copolymer prepared according to Preparation Example 1 using hexene-1 as a comonomer (hexene-1 content: 12% by weight) and 70% by weight of ethylene-propylene copolymer (Tafmer A A-4090 produced by Mitsui Petrochemical Industries Ltd.) was used.

COMPARATIVE EXAMPLE 4

A blend comprising 3% by weight of the polymer obtained in Preparation Example 2 and 97% by weight of polypropylene (F200S manufactured by Idemitsu Petrochemical Co.) was used.

Results of measurements in these Examples and Comparative Examples are shown in Table 1.

COMPARATIVE EXAMPLE 5

A film was obtained in the same manner as in Example 1 except that the polymer obtained in Preparation Example 2 was used and dischaging amount was 15 kg/hr and take-up speed was 11.3 m/min. Properties of this film were measured and the results are shown in Table 1.

COMPARATIVE EXAMPLE 6

A film was obtained in the same manner as in Example 1 except that the polymer obtained in Preparation Example 2 was used and die diameter was 40 mm. Properties of this film were measured and the results are shown in Table 1.

TABLE 1

| | Resin used | Melt index (g/10 min) | DSC maximum melting point (°C.) | Tensile modulus (kg/cm$^2$) | Elemendorf tear strength (MD) (kg/cm) | Elemendorf tear strength (TD) (kg/cm) | Elemendorf tear strength ratio (TD/MD) | Tearability |
|---|---|---|---|---|---|---|---|---|
| Example 1 | PB-1 | 2.1 | 126 | 4200 | 6.6 | 28.7 | 4.3 | Good |
| Example 2 | PB-1 | 1.0 | 108 | 4000 | 4.7 | 64 | 13.6 | Good |
| Example 3 | *1 | 4.1 | 98 | 7200 | 3.6 | 18.7 | 5.2 | Good |
| Comparative Example 1 | LLDPE | 1.2 | 122 | 2500 | 92 | 268 | 2.9 | *4 |
| Comparative Example 2 | LDPE | 2.0 | 108 | 2200 | 46 | 97 | 2.1 | *4 |

TABLE 1-continued

| | Resin used | Melt index (g/10 min) | DSC maximum melting point (°C.) | Tensile modulus (kg/cm$^2$) | Elemendorf tear strength (MD) (kg/cm) | Elemendorf tear strength (TD) (kg/cm) | Elemendorf tear strength ratio (TD/MD) | Tearability |
|---|---|---|---|---|---|---|---|---|
| Comparative Example 3 | *2 | 1.8 | 92 | 380 | 65 | 138 | 2.1 | *4 |
| Comparative Example 4 | *3 | 5.6 | 98 | 9700 | 49 | 88 | 1.8 | Difficult to tear |
| Comparative Example 5 | PB-1 | 1.0 | 108 | 3800 | 13 | 70 | 5.4 | *5 |
| Comparative Example 6 | PB-1 | 1.0 | 107 | 4000 | 9.6 | 34 | 3.5 | Difficult to tear |

*1: PB-1:PP = 50:50
2*: PB-1:Tafmer A A-4090 = 30:70
*3: PB-1:PP = 3:97
*4: Great in elongation and difficult to tear.
*5: A large force was required to tear.

EXAMPLE 4

A laminated film of three layers was prepared by sandwich-laminating the film obtained in Example 2 on one surface of LDPE film of 7 μm thick and a nylon-66 stretched film of 20 μm thick on another surface of the LDPE film by a laminate molding machine.

This film had a tensile modulus of 10,5000 kg/cm$^2$ and an Elemendorf tear strength ratio of 8.6 and was excellent in tearability.

COMPARATIVE EXAMPLE 7

Sandwich lamination was carried out in the same manner as in Example 4 except that the film obtained in Comparative Example 1 was used in place of the film obtained in Example 2. The resulting film was elongated when it was torn and tearing could not smoothly be performed.

EXAMPLE 5

A three-layer laminate film of PP/PB-1/PP=2 μm/11 μm/2 μm was prepared by extrusion from three-layer die. PP was a random polypropylene (F730N manufactured by Idemitsu Petrochemical Co.) and PB-1 was the polymer used in Example 2.

This three-layer laminate film had a tensile modulus of 5,500 kg/cm$^2$ and an Elemendorf tear strength ratio of 11 and was superior in tearability. Three-layer cast molding machine manufactured by Modern Machinery Co. was used and molding was effected at a draw ratio of 60 times.

What is claimed is:
1. A butene-1 polymer film which comprises a composition, which has a tensile modulus of 500-8,000 kg/cm$_2$, a tear strength in the MD or TD of up to 10 kg/cm, and a ratio of the tear strength in the MD and the tear strength in the TD (MD/TD or TD/MD) of at least 4, comprising:
   100 parts by weight of a butene-1 homopolymer, or a copolymer containing units of butene-1, and units of a different α-olefin in a molar ratio of units of α-olefin to units of butene-1 of 1:99 to 15:85, having: a melt index of 0.1-20 g/10 min, a ratio of weight average molecular weight to number average molecular weight of 3-12, and a maximum melting point of 60°-140° C. measured by a differential scanning calorimetric analysis method; and
   a positive amount, up to 200 parts by weight, of a different olefin polymer.

2. A film as claimed in claim 1 wherein said α-olefin is ethylene.

3. A butene-1 polymer film according to claim 2 wherein the butene-1-ethylene copolymer has a blocking degree of ethylene of 0.015 or less measured by C—NMR.

4. A butene-1 polymer film according to claim 2 wherein the butene-1-ethylene copolymer has a boiling diethyl ether soluble matter content of 3-25% by weight.

5. A butene-1 polymer film according to claim 1 wherein the different olefin polymer is a homopolymer of ethylene, propylene, pentene-1 or hexene-1, a copolymer of at least two of these monomers, or a mixture of these polymers.

6. A butene-1 polymer film according to claim 1 wherein the different olefin polymer is polypropylene.

7. A butene-1 polymer film according to claim 1 wherein thickness of the butene-1 polymer film is 10-150 μm.

8. A laminated film comprising the film as claimed in claim 1 and a distinct polyolefin resin layer laminated on at least one surface thereof.

9. A laminated film as claimed in claim 8 wherein said α-olefin is ethylene.

10. A laminated film according to claim 9 wherein the butene-1-ethylene copolymer has a blocking degree of ethylene of 0.015 or less measured by C—NMR.

11. A laminated film according to claim 9 wherein the butene-1-ethylene copolymer has a boiling diethyl ether soluble matter content of 3-25% by weight.

12. A laminated film according to claim 8 wherein the distinct polyolefin resin layer comprises a homopolymer of ethylene, propylene, pentene-1 or hexane-1, a copolymer of at least two of these monomers, or a mixture of these polymers.

13. A laminated film according to claim 8 wherein the distinct polyolefin resin layer comprises a polypropylene.

14. A laminated film according to claim 8 wherein the thickness of the butene-1 polymer film is 7-30 μm and the ratio of the thickness of the butene-1 polymer film to that of the distinct polyolefin resin layer is 0.5-20.

15. A laminated film according to claim 8 wherein at least one additional layer, selected from the group consisting of a polyolefin resin layer, a polyester resin layer and a polyamide resin layer, is additionally laminated on the distinct polyolefin resin layer.

* * * * *